United States Patent Office 3,540,291
Patented Nov. 17, 1970

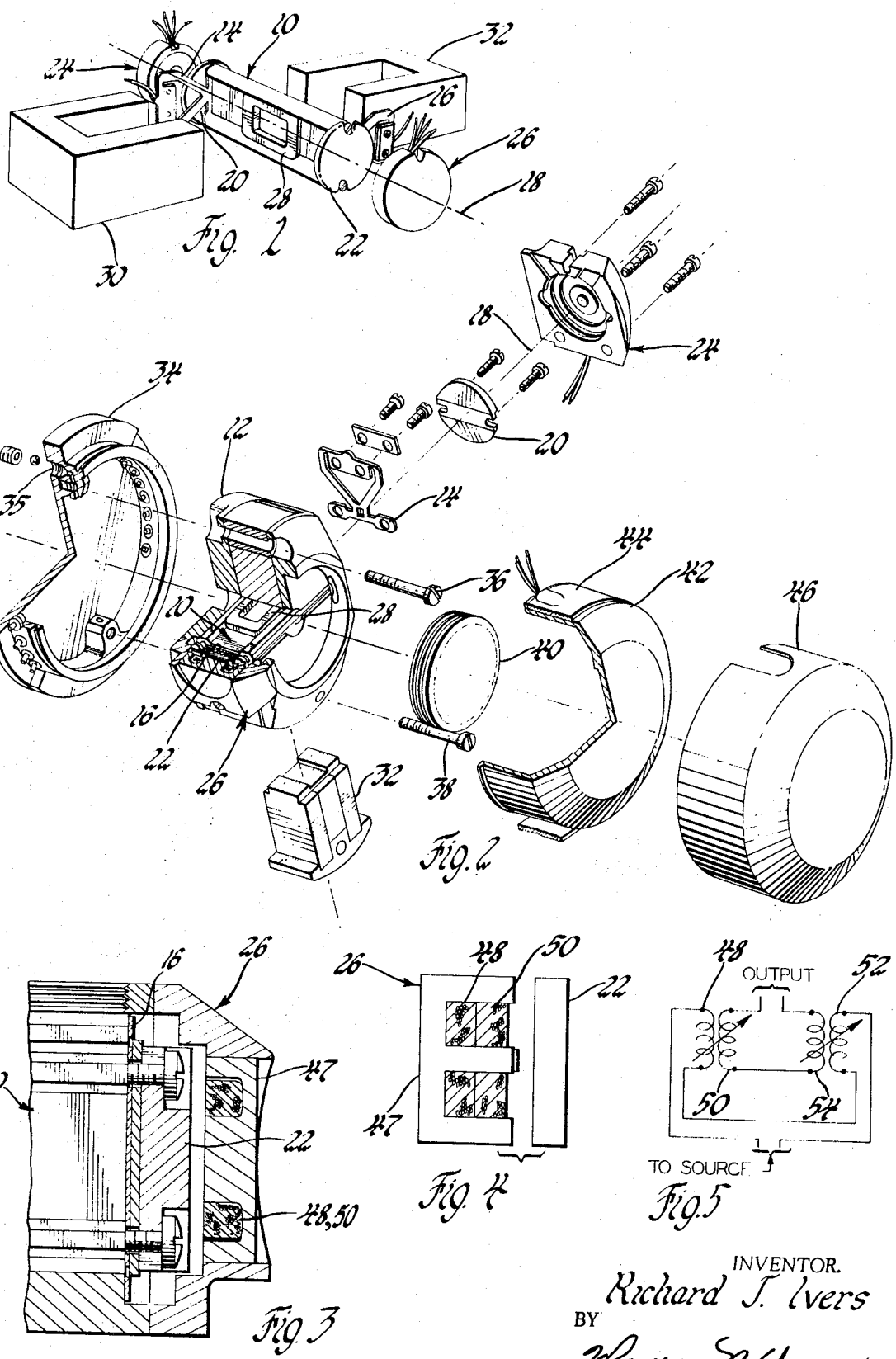

3,540,291
SPRING SUSPENSION ACCELEROMETER
Richard J. Ivers, Arlington, Mass., assignor to General Motors Corporation, Detroit, Mich., a corporation of Delaware
Filed Dec. 23, 1966, Ser. No. 604,238
Int. Cl. G01p *15/02, 15/08*
U.S. Cl. 73—517
3 Claims

ABSTRACT OF THE DISCLOSURE

An acceleration sensing device is disclosed comprising a test mass which is displaced relative to a housing in response to acceleration forces along a sensitive axis. Mass is supported relative to housing by mechanical spring means producing a force resisting displacement. This force is at least partially compensated by a second force of opposite sense produced by magnetic spring means such as electromagnetic pickoff assemblies which also function to indicate relative displacement between mass and housing. Mass is restored to reference position by suitable forcer such as a mass-carried coil placed in a magnetic field and energizable to produce directionally selective force.

---

This invention relates to accelerometers and more particularly to an accelerometer having a test mass which is supported by mechanical spring means, the force-effect of which is at least significantly balanced by magnetic pickoff means producing force displacement effects of opposite sense. The invention may be best understood by reference to the following complete disclosure of an illustrative embodiment and the accompanying drawings of which:

FIG. 1 is an isometric view of some of the basic elements of the embodiment in assembled configuration;

FIG. 2 is an exploded view of a substantially complete embodiment of the FIG. 1 device;

FIG. 3 is a sectional view of a pickoff assembly;

FIG. 4 is a simplified view of a pickoff assembly; and

FIG. 5 is a schematic diagram of the pickoff input and output circuit.

FIG. 1 shows some of the internal components of a single-axis linear type accelerometer including an elongate test mass 10. Mass 10 is supported by means of flat A-frame mechanical springs 14 and 16. The springs are shaped to permit mass 10 to displace in either direction along an input axis 18 and to restrict the mass from movement in any other direction. Springs 14 and 16, when connected to a housing such as 12 in FIG. 2, tend to resist displacement of mass 10 away from a reference position and to exert a positive spring force; that is, a force which varies in proportion to displacement and tends to return the mass 10 to the reference position.

A pair of magnetic armatures 20 and 22 are suitably attached to the axial extremities of mass 10. Armatures 20 and 22 are flat ferrite discs describing planes which are substantially normal to axis 18. A pair of pickoff stators 24 and 26 are disposed adjacent, but axially spaced from armatures 20 and 22 respectively and are adapted for mounting on the housing 12 as shown in FIG. 2. It is understood that the housing 12 can be any structure defining a physical reference frame and does not necessarily enclose or contain the mass 10. Each of the stators 24 and 26 includes a primary winding which is energizable with alternating current to produce a magnetic force of attraction between the stator and the armature associated therewith. This force of attraction increases with increasing proximity of the armature to the stator and, therefore, produces a magnetic spring effect. In accordance with the desired operation of the FIG. 1 embodiment, the negative spring effect of the stators 24 and 26 in combination with the armatures 20 and 22 is adjusted to at least partially oppose the positive spring effect of the mechanical springs 14 and 16 over the expected range of displacement of mass 10. Accordingly, mass 10 is mechanically supported relative to a surrounding reference frame, but is comparatively readily displaced along axis 18 in response to acceleration forces acting thereon.

The accelerometer shown in the figures contemplates operation in a force rebalance mode; that is, displacement of mass 10 triggers a force producing mechanism which tends to return the mass to a reference position. To carry out this function, mass 10 carries a large conductive coil 28 which is disposed within the mass such that the current path defined thereby lies in a plane substantially parallel to axis 18. U shaped permanent magnets 30 and 32 are disposed laterally adjacent conductive coil 28, and facing one another to produce a transverse magnetic field intercepting the coil 28. Accordingly, energization of coil 28 with current of selected direction and amplitude produces a force acting upon the mass 10 and tending to return the mass to a reference position.

FIG. 2 shows the embodiment of the accelerometer in greater detail. Mass 10 is disposed within an elongate space within a generally annular housing 12. Springs 14 and 16 are connected between the housing and the mass 10 to permit the aforementioned linear displacement along axis 18 and to substantially fully resist any displacement in other directions. Magnetic armatures 20 and 22 are exposed adjacent the outer periphery of housing 12. The associated pickoff stator 24 and 26 are substantially coaxial with the armatures and are suitably mounted to the housing 12 by means of threaded fasteners. In addition, permanent magnets 30 and 32 which may be formed by an assembly of several segments as shown in FIG. 2 are inserted radially into the housing 12 to produce the field which intercepts coil 28. The entire assembly of the mass 10, armatures 20 and 22, stator 24 and 26, and magnets 30 and 32, within housing 12 may be seated within a mounting base 34 and held in place by means of threaded fasteners 36 and 38. Assuming the device is to be partially or fully filled with floatation fluid, an opening 35 is provided for the admission of such fluid and a bellows 40 is provided for compensation of fluid expansion due to temperature variations. The filled chamber is then sealed by means of a cylindrical cap 42, having an electrical heater strip 44 attached to the outer cylindrical surface thereof. The entire assembly may be covered by a cylindrical dust cap 46 for final protection.

FIGS. 3, 4, and 5 illustrate the operation of the pickoff stators 24 and 26 in greater detail. As shown in FIGS. 3 and 4, stator 26, which is taken to be representative of both stators, includes a ferrite core 47 carrying a primary winding 38 and a secondary winding 50. Stator 24, not shown in detail, carries a primary winding 52 and a secondary winding 54. FIG. 5 shows the two primary windings 48 and 52 connected in series with a source of alternating current. When so energized with alternating current, coils 48 and 52 produce a flux pattern causing forces of attraction to exist between the core 47 and the associated armature 22. In a reference position wherein the test mass 10 is centered between the stator 24 and 26, the forces of attraction are balanced. However, if an acceleration force causes the test mass 10 to be displaced closer to stator 26; for example, the magnetic force of attraction between armature 22 and core 47 increases while the force of attraction acting upon armature 20 decreases correspondingly. The mechanical spring force opposes this unbalance as armature 22 approaches and retreats from coil 47 in accordance with displacements of mass 10. The air gap between the armature and core varies in size and causes a variation in the amount of flux which travels through the center post of core 47. Accordingly, secondary windings 50 experience flux amplitude variations and thus have induced therein voltages which vary in amplitude correspondingly. This voltage may be taken as an indication of the relative displacement of mass 10 and employed to control the energization of forcer coil 28 as will be apparent to those skilled in the art. FIG. 5 shows secondary coils 50 and 54 connected in series to produce an addition of the respective outputs.

It is to be understood that the embodiment of the invention described above is illustrative only and that various modifications and additions to the basic means for carrying out the invention are possible. For a definition of the invention, reference should be taken to the appended claims.

What is claimed is:

1. A single-axis force rebalance type accelerometer comprising a rigid housing, an elongate test mass disposed within the housing, a pair of resilient spring members connected between the housing and respective extremities of the mass to support the mass and to permit spring restrained displacement of the mass along an input axis, first and second magnetic armatures mounted on the mass at axially opposite extremities thereof, first and second electromagnetic pickoff stators disposed adjacent but axially spaced from the first and second armatures respectively, each of the stators including primary and secondary windings, said primary windings being energizable to produce magnetic flux tending to attract the armature, the secondary winding producing an output signal representing the relative displacement of the stators and armatures as a function of the quantity of flux linking the secondary winding, a rebalancing means comprising a conductive coil carried by the test mass and defining a current path lying in a plane parallel to the axis of displacement and further comprising a pair of permanent magnets mounted to the housing for producing a field transverse to the axis and intercepting the conductive coil.

2. A force-rebalance type accelerometer comprising a housing, an elongate test mass, normally disposed in a reference position in the housing, a pair of resilient spring members disposed at opposite extremities of the test mass along the axis of permitted displacement and producing a first force on the mass proportional to displacement thereof from the reference position and in a direction opposing the displacement, first and second armatures mounted on the mass at opposite extremities thereof, along the axis of permitted displacement, first and second pickoff stator assemblies attached to the housing and adjacent but axially spaced from the first and second armatures respectively, each of the stators including a primary winding energizable to produce magnetic flux between the winding and the associated armature producing a second force on the mass proportional to and in the direction of said displacement, thereby at least significantly opposing the first force, said stator assemblies including in addition to said primary winding, a secondary winding for producing an output signal representing the relative displacement of the stator assembly and armature as a function of the quantity of flux linking the secondary winding, a rebalance means comprising a conductive coil carried by the mass and oriented to establish a current path which essentially lies in a plane parallel to the axis of permitted displacement and further comprising means carried by the housing to produce a magnetic field transverse to the axis and intercepting the coil.

3. An accelerometer as defined in claim 2 wherein one of said spring members extending in one direction from said mass to said housing and normally lies in a plane perpendicular to said axis, the other of said spring members extends in the opposite direction from said mass to said housing and normally lies in a plane perpendicular to said axis, said springs being generally triangular in shape with the vertex thereof secured to said mass and the base thereof secured to said housing.

References Cited

UNITED STATES PATENTS

| | | | |
|---|---|---|---|
| 3,133,446 | 5/1964 | Cohen | 73—517 |
| 2,552,722 | 5/1951 | King | 73—516 |
| 2,643,869 | 6/1953 | Clark | 73—517 |
| 2,734,736 | 2/1956 | Payne | 73—398 |
| 3,023,626 | 3/1962 | Bonnell | 73—517 |
| 3,076,343 | 2/1963 | Dumas et al. | 73—517 |
| 3,246,525 | 4/1966 | Clark | 73—517 |

JAMES J. GILL, Primary Examiner

H. GOLDSTEIN, Assistant Examiner

U.S. Cl. X.R.

336—30